United States Patent [19]

Causey

[11] Patent Number: 4,957,755

[45] Date of Patent: Sep. 18, 1990

[54] METHOD FOR PRODUCING MICROWAVEABLE SNACKS

[76] Inventor: D. Richard Causey, P.O. Box 1110, Windsor, Calif. 95492

[21] Appl. No.: 510,547

[22] Filed: Apr. 18, 1990

[51] Int. Cl.$^5$ ................................................ A23L 1/00
[52] U.S. Cl. .................................... 426/242; 426/243; 426/625; 426/808
[58] Field of Search ............... 426/241, 242, 243, 625, 426/808, 523; 219/10.55 M

[56] References Cited

U.S. PATENT DOCUMENTS 4,496,816  1/1985  McNamara .......................... 426/243

FOREIGN PATENT DOCUMENTS 2076630A  12/1981  United Kingdom ................ 426/523

*Primary Examiner*—George Yeung
*Attorney, Agent, or Firm*—Larry D. Johnson

[57] ABSTRACT

A method and composition for combining two or more separate food products, one of which is ordinarily not effectively prepared in a microwave oven, that are microwaveable together to yield a desired result. Specifically, a quantity of pork rind pellets can be successfully and completely popped in a standard microwave oven by inclusion of a quantity of unpopped popping corn kernels to the container of the pellets before cooking. The popping corn kernels are efficiently heated by the microwave energy and, as they pop, provide a desired agitating motion to the mixture, thereby moving the pork rind pellets within the container and increasing the likelihood of the complete popping of the pellets. Thus, the exploding popping corn kernels provide the requisite vehicle for mechanical mixing during cooking of the heated snack.

4 Claims, No Drawings

METHOD FOR PRODUCING MICROWAVEABLE SNACKS

BACKGROUND OF THE INVENTION

1. Field of the Invention

This invention relates generally to foods and methods of food preparation, and more specifically to a composition and method for producing an improved microwaveable snack.

2. Description of the Prior Art

The snack food made from fried pork rinds, commonly known as "pork skins" or "cracklins", is well known and very popular. These pork rind snacks are typically prepared from small pork rind pellets that have been smoked and cured, which are then deep fried in lard or fat to pop and expand the pork rind pellet into a larger, low density snack food. These popped pork rind snacks may then be further seasoned, and are subsequently packaged for purchase by the consumer.

It is of course desirable to additionally provide the consumer with a snack food that can be prepared at home, as by heating in a microwave oven, for a fresher, hot and ready-to-eat product. However, attempts to heat and pop these pork rind pellets in standard microwave ovens have met with limited success. For example, simply heating a quantity of the pork rind pellets in a microwave oven often leaves many of the pellets unpopped and therefore wasted, as the uncooked pellets are essentially inedible. It has been determined that the pork rind pellets must be mixed and moved within the microwave oven while being heated to effectively pop the majority of the pellets into popped pork rind snacks. Unfortunately, such mechanical mixing is difficult or impossible to perform in most standard microwave ovens, and would require repeated interruption of the cooking process to manually mix the pork rind pellets in their container.

SUMMARY OF THE INVENTION

The method for producing microwaveable snacks of this invention provides a method and composition for combining two or more separate food products, one of which is ordinarily not effectively prepared in a microwave oven, that are microwaveable together to yield a desired result. Specifically, a quantity of pork rind pellets can be successfully and completely popped in a standard microwave oven by inclusion of a quantity of unpopped popping corn kernels to the container of the pork rind pellets before cooking. The popping corn kernels are efficiently heated by the microwave energy and, as they pop into popcorn, provide a desired agitating motion to the mixture, thereby colliding with and moving the pork rind pellets within the container and increasing the likelihood of the complete popping of the pork rind pellets into popped snacks. Thus, the popping of the popping corn kernels provides the requisite vehicle for mechanical mixing of the pork rind pellets during the cooking of the heated snack.

A further desirable aspect of the microwave cooking of the combination of pork rind pellets and popping corn kernels is that both materials react to the microwave energy and can be prepared at approximately the same cooking rate (assuming the requisite mixing of the pork rind pellets by the popping of the popping corn kernels). In addition, it has been determined that the popped popcorn absorbs the characteristic smoked bacon flavor from the popped pork rind snacks. Still further, the resultant cooked pork rind snacks have fewer calories and cholesterol than those prepared in the traditional manner (i.e., fried in lard or fat).

DETAILED DESCRIPTION OF A PREFERRED EMBODIMENT

In the preferred embodiment, a quantity of pork rind pellets and popping corn kernels are mixed together and seasoned, and an appropriate amount (e.g., three ounces) of the combined ingredients are placed in a commercially available microwave bag or other container. The pork rind pellets are preferably of a size in the range of three-eights inch to one-half inch in diameter, to yield an appropriate size of popped pork rind snack. A desirable ratio of popping corn kernels to pork rind pellets is two to one (by weight). Heating of the mixture in a microwave oven causes the popping corn kernels to pop and expand into popcorn, often on the order of ten to twenty-three times the size of the original kernel. This popping action of the popping corn kernels results from a number of factors, including the vaporization and expansion of the moderate (e.g., eight to thirteen percent) retained water in the kernels. In any event, the staggered explosions of these popping corn kernels causes them to collide with and mechanically mix the pork rind pellets within the heating area of the microwave oven, thereby enhancing the cooking process of the pork rind pellets.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. A method for preparing pork rind snacks in a standard microwave oven comprising the steps of:
   combining a quantity of pork rind pellets with a quantity of an effective popping agent in a microwaveable container, and heating the combined mixture in a microwave oven so that the popping of the popping agent mechanically mixes the pork rind pellets within the heating area of the microwave oven to enhance the popping of the pork rind pellets.

2. The method for preparing pork rind snacks of claim 1 wherein said popping agent comprises popping corn kernels.

3. The method for preparing pork rind snacks of claim 2 wherein said popping corn kernels and pork rind pellets are combined in a ratio of approximately two to one by weight.

4. The method for preparing pork rind snacks of claim 3 wherein said pork rind pellets are of a size in the range of three-eights inch to one-half inch in diameter.

* * * * *